United States Patent
Iwamoto et al.

(10) Patent No.: US 11,163,304 B2
(45) Date of Patent: Nov. 2, 2021

(54) TRAJECTORY DETERMINATION DEVICE (71) Applicant: TOYOTA JIDOSHA KABUSHIKI KAISHA, Toyota (JP)

(72) Inventors: Takayuki Iwamoto, Sunto-gun (JP); Hojung Jung, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 16/356,051

(22) Filed: Mar. 18, 2019

(65) Prior Publication Data
US 2019/0324457 A1  Oct. 24, 2019

(30) Foreign Application Priority Data
Apr. 19, 2018 (JP) .............................. JP2018-080680

(51) Int. Cl.
*G05D 1/00* (2006.01)
*G05D 1/02* (2020.01)

(52) U.S. Cl.
CPC ......... *G05D 1/0088* (2013.01); *G05D 1/0221* (2013.01); *G05D 1/0289* (2013.01); *G05D 2201/0213* (2013.01)

(58) Field of Classification Search
CPC .. G05D 1/0088; G05D 1/0289; G05D 1/0221; G05D 2201/0213; B60W 60/0013; B60W 2540/221; B60W 2554/00; B60W 30/0953; B60W 30/0956; B60W 2540/00; B60W 30/025; G08G 1/096838; G08G 1/0969; G08G 1/16; G08G 1/166; G06Q 10/047
See application file for complete search history.

(56) References Cited

U.S. PATENT DOCUMENTS 5,822,707 A * 10/1998 Breed .................. B60N 2/2806
701/49
5,983,147 A * 11/1999 Krumm .............. G06K 9/00838
701/45
6,007,095 A * 12/1999 Stanley ............. B60R 21/01536
280/735

(Continued)

FOREIGN PATENT DOCUMENTS

CN 105138733 A 12/2015
CN 107274719 A 10/2017

(Continued)

*Primary Examiner* — Sze-Hon Kong
(74) *Attorney, Agent, or Firm* — Sughrue Mion, PLLC (57) ABSTRACT A trajectory determination device includes a position estimation unit configured to estimate a position of a vehicle, an acquisition unit configured to acquire driving environment information relating to a driving environment of the vehicle, a generation unit configured to generate a plurality of trajectory candidates of the vehicle based on the position of the vehicle and map information, an evaluation unit configured to evaluate driving comfort for each trajectory candidate based on the driving environment information acquired by the acquisition unit and the plurality of trajectory candidates generated by the generation unit, and a selection unit configured to select one trajectory to travel with the autonomous driving from the plurality of trajectory candidates based on the driving comfort for each trajectory candidate evaluated by the evaluation unit.

3 Claims, 8 Drawing Sheets

(56) References Cited

U.S. PATENT DOCUMENTS

| | | | | |
|---|---|---|---|---|
| 6,043,743 | A * | 3/2000 | Saito | B60N 2/002 180/271 |
| 6,324,453 | B1 * | 11/2001 | Breed | B60N 2/0232 180/169 |
| 6,459,974 | B1 * | 10/2002 | Baloch | B60R 21/01538 701/45 |
| 9,796,303 | B1 * | 10/2017 | Schonfeld | B60N 2/2812 |
| 10,214,118 | B1 * | 2/2019 | Jain | B60N 2/0244 |
| 10,643,085 | B1 * | 5/2020 | Kim | G06K 9/00362 |
| 10,671,075 | B1 * | 6/2020 | Kobilarov | G05D 1/0088 |
| 2012/0283913 | A1 * | 11/2012 | Lee | B62D 15/025 701/41 |
| 2016/0026182 | A1 | 1/2016 | Boroditsky et al. | |
| 2016/0046237 | A1 | 2/2016 | Sugimoto et al. | |
| 2016/0288788 | A1 * | 10/2016 | Nagasaka | G05D 1/0223 |
| 2017/0285646 | A1 * | 10/2017 | Connor | B60W 40/04 |
| 2017/0285647 | A1 | 10/2017 | Saito et al. | |
| 2018/0022361 | A1 * | 1/2018 | Rao | B60W 30/143 701/23 |
| 2018/0229723 | A1 * | 8/2018 | Jiang | B60W 10/20 |
| 2018/0304901 | A1 | 10/2018 | Duan et al. | |
| 2019/0039591 | A1 * | 2/2019 | Raveendran | B60W 30/0953 |
| 2019/0064824 | A1 * | 2/2019 | Nix | G05D 1/0088 |
| 2019/0072966 | A1 * | 3/2019 | Zhang | G08G 1/166 |
| 2019/0072973 | A1 * | 3/2019 | Sun | B62D 15/026 |
| 2019/0086924 | A1 * | 3/2019 | Greenfield | B60W 60/0011 |
| 2019/0250000 | A1 * | 8/2019 | Zhang | G05D 1/021 |
| 2019/0250617 | A1 * | 8/2019 | Ford | B60W 50/0097 |
| 2019/0278277 | A1 * | 9/2019 | Tao | B60W 60/0017 |
| 2019/0286151 | A1 * | 9/2019 | Palanisamy | G01C 21/3461 |
| 2019/0317508 | A1 * | 10/2019 | Zhang | G08G 1/096844 |
| 2019/0317512 | A1 * | 10/2019 | Zhang | B60W 60/0013 |
| 2019/0317515 | A1 * | 10/2019 | Zhang | B60W 30/0953 |
| 2019/0346845 | A1 * | 11/2019 | Rottkamp | B62D 15/0265 |
| 2019/0369637 | A1 * | 12/2019 | Shalev-Shwartz | G06K 9/00791 |
| 2020/0031342 | A1 * | 1/2020 | Oguro | G06K 9/00805 |
| 2020/0086869 | A1 * | 3/2020 | Oguro | B60W 60/001 |
| 2020/0103902 | A1 * | 4/2020 | Dominic | G05D 1/0231 |
| 2020/0216094 | A1 * | 7/2020 | Zhu | B60W 60/0013 |
| 2020/0255026 | A1 * | 8/2020 | Katardjiev | G08G 1/096725 |
| 2020/0385018 | A1 * | 12/2020 | Kameoka | B60W 40/072 |

FOREIGN PATENT DOCUMENTS

| | | |
|---|---|---|
| JP | 7-108849 A | 4/1995 |
| JP | 8-271275 A | 10/1996 |
| JP | 2007-205764 A | 8/2007 |
| JP | 2011-238054 A | 11/2011 |
| JP | 2013-53879 A | 3/2013 |
| JP | 2016-193719 A | 11/2016 |
| JP | 2017072440 A | 4/2017 |
| WO | 2014/167701 A1 | 10/2014 |
| WO | 2017/159493 A1 | 9/2017 |

\* cited by examiner

| TRAJECTORY | DRIVING ENVIRONMENT INFORMATION | EVALUATION VALUE |
|---|---|---|
| TRAJECTORY TR1 | DRIVING ENVIRONMENT EB1 | 0.5 |
| TRAJECTORY TR2 | DRIVING ENVIRONMENT EB2 | 0.3 |
| TRAJECTORY TR3 | DRIVING ENVIRONMENT EB3 | 0.8 |
| ... | ... | ... |

| TRAJECTORY | DRIVING ENVIRONMENT INFORMATION | INFORMATION RELATING TO INPUT OPERATION | EVALUATION VALUE |
|---|---|---|---|
| TRAJECTORY TR1 | DRIVING ENVIRONMENT EB1 | 0 | 0.5 |
| TRAJECTORY TR4 | DRIVING ENVIRONMENT EB4 | -1 | 0.4 |
| TRAJECTORY TR6 | DRIVING ENVIRONMENT EB6 | +3 | 0.8 |
| ... | | ... | ... |

| TRAJECTORY | DRIVING ENVIRONMENT INFORMATION | INFORMATION RELATING TO BIOMETRIC INFORMATION | EVALUATION VALUE |
|---|---|---|---|
| TRAJECTORY TR1 | DRIVING ENVIRONMENT EB1 | -1 | 0.5 |
| TRAJECTORY TR3 | DRIVING ENVIRONMENT EB3 | -5 | 0.1 |
| TRAJECTORY TR6 | DRIVING ENVIRONMENT EB6 | 0 | 0.8 |
| ... | | ... | ... |

TRAJECTORY DETERMINATION DEVICE

CROSS-REFERENCE TO RELATED APPLICATION

This application is based on Japanese Patent Application No. 2018-080680 filed with Japan Patent Office on Apr. 19, 2018, the entire contents of which are hereby incorporated by reference.

TECHNICAL FIELD

The present disclosure relates to a trajectory determination device.

BACKGROUND

US Unexamined Patent Publication No. 2016/0026182 discloses a device that performs an autonomous driving of a vehicle. The device performs the autonomous driving of the vehicle based on an individual driver's specific driving style (driving profile).

SUMMARY

Incidentally, a vehicle that travels with an autonomous driving selects a trajectory in which a travel safety is secured. However, in some case, even if the travel safety is secured in the trajectory, the driver may feel discomfort in a driving environment. In such a case, the driver may end the autonomous driving of the vehicle under the assumption that the driving is psychologically burdensome. The present disclosure provides a technology in which a trajectory can be determined while taking driving comfort into consideration.

An aspect of the present disclosure provides a trajectory determination device that is configured to determine a trajectory of a vehicle that travels with an autonomous driving. The device includes a position estimation unit, an acquisition unit, a generation unit, an evaluation unit, and a selection unit. The position estimation unit is configured to estimate a position of the vehicle. The acquisition unit is configured to acquire driving environment information relating to a driving environment of the vehicle. The generation unit is configured to generate a plurality of trajectory candidates of the vehicle based on the position of the vehicle and map information. The evaluation unit is configured to evaluate driving comfort for each trajectory candidate based on the driving environment information acquired by the acquisition unit and the plurality of trajectory candidates generated by the generation unit. The selection unit is configured to select one trajectory to travel with the autonomous driving from the plurality of trajectory candidates based on the driving comfort for each trajectory candidate evaluated by the evaluation unit.

According to the trajectory determination device, the driving comfort for each trajectory candidate is evaluated by the evaluation unit based on the driving environment information and the trajectory candidates. Then, one trajectory for traveling with the autonomous driving is selected from the plurality of trajectory candidates based on the driving comfort for each trajectory candidate. Therefore, the device can determine the trajectory for traveling with the autonomous driving from the plurality of trajectory candidates, while taking the driving comfort evaluated for each trajectory candidate into consideration.

In the embodiment, the evaluation unit may be configured to output an evaluation value for each trajectory candidate based on a comfort database, the driving environment information acquired by the acquisition unit, and the plurality of trajectory candidates generated by the generation unit. The comfort database may be configured to associate that the driving environment information, the trajectory, and an evaluation value indicating a degree of the driving comfort. In this case, the device can evaluate the driving comfort of the trajectory candidate using the relationship between the driving environment information stored in the comfort database, the trajectory, and the evaluation value.

In the embodiment, the evaluation unit may be configured to receive a machine learning such that the driving environment information and the trajectory are input and an evaluation value is output based on teacher data in which the driving environment information, the trajectory, and the evaluation value indicating a degree of the driving comfort are associated with each other, and may be configured to output the evaluation value for each trajectory candidate based on the driving environment information acquired by the acquisition unit and the plurality of trajectory candidates generated by the generation unit. In this case, the device can evaluate the driving comfort of the trajectory candidates based on the result of learning the relationship between the driving environment information, the trajectory, and the evaluation value.

In the embodiment, the trajectory determination device may further include a reception unit configured to receive an input operation relating to the driving comfort of an occupant of the vehicle, and a first collection unit configured to generate first collection data in which information relating to the input operation by the occupant, received by the reception unit, the trajectory of the vehicle when the input operation is received, and the driving environment information when the input operation is received are associated with each other. In this case, the device can generate the first collection data in which the information corresponding to the occupant's input operation is used as the evaluation value. The first collection data can be used, for example, as the teacher data for the evaluation unit and can be stored in the comfort database.

In the embodiment, the trajectory determination device may further include a sensor configured to acquire biometric information on an occupant, and a second collection unit configured to generate second collection data in which information relating to the biometric information on the occupant, acquired by the sensor, the trajectory of the vehicle when the biometric information is acquired, and the driving environment information when the biometric information is acquired are associated with each other. In this case, the device can generate the second collection data in which the information corresponding to the biometric information is used as the evaluation value. The second collection data can be used as the teacher data for the evaluation unit, for example, and can be stored in the comfort database.

In the embodiment, the evaluation value may indicate that the driving comfort is excellent as the value increases, and the selection unit may be configured to select a trajectory candidate having a highest evaluation value from the plurality of trajectory candidates as a trajectory for traveling with the autonomous driving. In this case, the device can select a trajectory that gives the least discomfort to the occupant from the trajectory candidates.

In the embodiment, the driving environment information may include at least one of the number of surrounding vehicles around the vehicle, a time to collision with the surrounding vehicles, and an existence density of the surrounding vehicles. The correlation between the vehicle and the surrounding vehicle is one of factors that cause the discomfort to the occupant. The device can clarify the relationship between the trajectory, the driving comfort, and the driving environment information by including at least one of the above-described factors in the driving environment information.

According to various aspects of the present disclosure, the trajectory can be determined while taking the driving comfort into consideration.

DETAILED DESCRIPTION

Hereinafter, exemplary embodiments will be described with reference to the drawings. In the description below, the same reference numerals will be given to the same or equivalent elements, and the description thereof will not be repeated.

First Embodiment

Configuration of Autonomous Driving System

Figure 1:
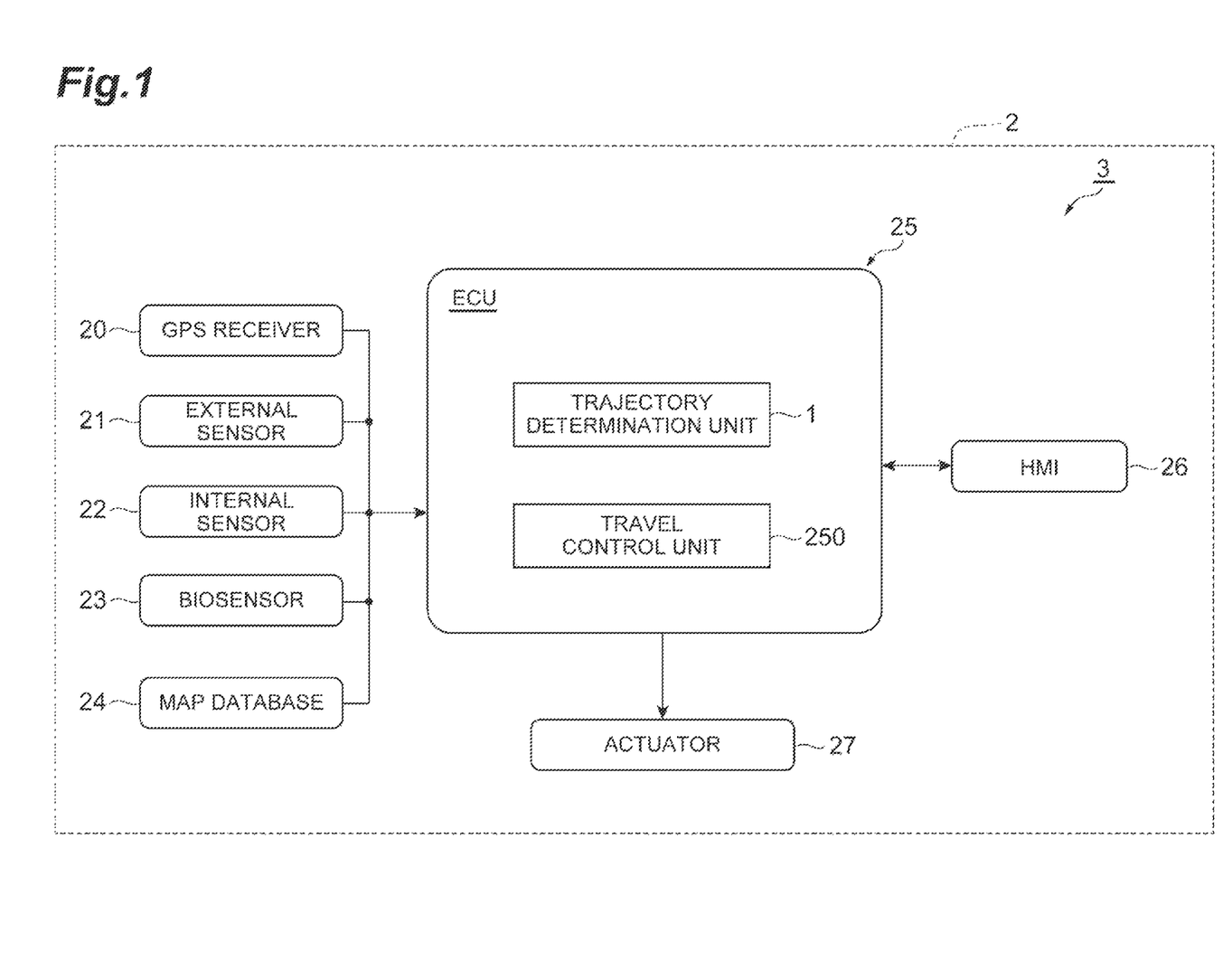
FIG. 1 is a block diagram illustrating an example of a configuration of a vehicle including a trajectory determination unit in an embodiment.

FIG. 1 is a block diagram illustrating an example of a configuration of a vehicle 2 including a trajectory determination unit 1 (an example of a trajectory determination device) in to a first embodiment. As illustrated in FIG. 1, an autonomous driving system 3 is mounted on the vehicle 2 such as a passenger car. The trajectory determination unit 1 configures a part of the autonomous driving system 3. The trajectory determination unit 1 is a device that determines an autonomous driving trajectory of the vehicle 2. The autonomous driving trajectory (a trajectory) of the vehicle 2 includes a path on which the vehicle 2 travels and a speed of the vehicle 2. The autonomous driving trajectory may be a trajectory in which the vehicle 2 travels for seconds or minutes.

The autonomous driving system 3 performs the autonomous driving of the vehicle 2. The autonomous driving is a vehicle control for the vehicle 2 to autonomously travel toward a destination set in advance. The destination may be set by an occupant such as a driver, or may be automatically set by the autonomous driving system 3. In the autonomous driving, the driver does not need to perform the driving operation, and the vehicle 2 travels automatically.

The autonomous driving system 3 includes a GPS receiver 20, an external sensor 21, an internal sensor 22, a biosensor 23, a map database 24, an electronic control unit (ECU) 25, a human machine interface (HMI) 26, and an actuator 27. The ECU is an electronic control unit including a central processing unit (CPU), read only memory (ROM), random access memory (RAM), a controller area network (CAN) communication circuit, and the like.

The GPS receiver 20 measures a position of the vehicle 2 (for example, latitude and longitude of the vehicle 2) by receiving signals from equal to or more than three GPS satellites.

The external sensor 21 is a detection device that detects a situation around the vehicle 2. The external sensor 21 includes at least one of a camera and a radar sensor. The camera is an imaging device that images external situations of the vehicle 2. As an example, the camera is provided on the back side of the windshield of the vehicle 2. The camera may be a monocular camera or may be a stereo camera. The stereo camera includes two imaging units arranged to reproduce binocular parallax.

The radar sensor is a detection device that detects a body around the vehicle 2 using radio waves (for example, millimeter waves) or light. The radar sensor transmits the radio wave or light to the surroundings of the vehicle 2, and detects the body by receiving the radio waves or light reflected from the body. The radar sensor includes, for example, at least millimeter wave radar or LIDAR (Light Detection and Ranging).

The external sensor 21 may be prepared for each detection target. For example, the external sensor 21 may include a sensor for detecting the object and a dedicated sensor prepared for detecting a specific object. As an example, the dedicated sensor is a camera for detecting a traffic signal. In that case, the traffic signal and the signal state are detected by template matching using color information (for example luminance) on an image acquired by the camera and/or a shape of the image (for example, using Hough transform). In order to improve the detection accuracy of the traffic signal, map information to be described later may be used.

The internal sensor 22 is a detection device that detects a travel state of the vehicle 2. The internal sensor 22 includes a vehicle speed sensor, an accelerator sensor, and a yaw rate sensor. The vehicle speed sensor is a measurement device that measures a speed of the vehicle 2. As the vehicle speed sensor, for example, a vehicle wheel speed sensor is used, which is provided on vehicle wheels of the vehicle 2 or on a drive shaft rotating integrally with vehicle wheels, and measures a rotational speed of the vehicle wheels.

The accelerator sensor is a measurement device that measures an acceleration of the vehicle 2. The accelerator sensor includes, for example, a longitudinal accelerator sensor that measures acceleration in the longitudinal direction of the vehicle 2 and a lateral accelerator sensor that measures a lateral acceleration of the vehicle 2. The yaw rate sensor is a measurement device that measures a yaw rate (a rotation angular velocity) around the vertical axis at the center of gravity of the vehicle 2.

As the yaw rate sensor, for example, a Gyro sensor can be used. The biosensor 23 acquires biometric information on an occupant of the vehicle 2. The biometric information is information on a body of the occupant. An example of the biometric information is heart rate, blood pressure, body temperature, handle grasping pressure, sweating amount and the like. The biosensor 23 is provided, as an example, in vehicle configuration elements that are in contact with the human body. The vehicle configuration elements are, for example, a seat or an operating handle (including a steering wheel).

The map database 24 is a database that stores map information. The map database 24 is formed, for example, in a hard disk drive (HDD) mounted on the vehicle 2. The map database 24 can include a plurality of maps as the map information. A traffic rule map is an example of the map. The traffic rule map is a three-dimensional database in which traffic rules and position information on the map are associated with each other. The traffic rule map includes a lane position and a lane connection form, and the traffic rule is associated with each lane. The traffic rule includes speed limitations. That is, the traffic rule map is a database in which the speed limitation and the position are associated with each other. The traffic rule may include other general rules such as a priority road, a temporary stop, no entry, and a one-way.

A map that includes an output signal of the external sensor 21 for using simultaneous localization and mapping (SLAM) technology may be included in the map information. Position confirmation information (localization knowledge) used for recognizing the position of the vehicle 2 is an example of the map information. The position confirmation information is three-dimensional data in which a feature point and position coordinates are associated with each other. The feature points are a point showing a high reflectance in a result of detection performed by the LIDAR or the like, a structure having a shape that produces a characteristic edge (for example, an external shape of a sign, a pole, and a curb).

The map information may include background information (background knowledge). The background information is a map in which a three-dimensional object existing as a stationary object (stationary object) whose position on the map does not change is represented by voxels.

The map information may include a traffic signal position (a traffic light location) which is three-dimensional position data of the traffic signal. The map information may include earth surface information (a surface knowledge) which is ground image data relating to a height level of the ground and the like. The map information may include trajectory information (a path knowledge) which is data representing a preferable travel trajectory defined on the road.

A part of the map information included in the map database 24 may be stored in a storage device different from the HDD storing the map database 24. A part or all of the map information included in the map database 24 may be stored in a storage device other than the storage device included in the vehicle 2. The map information may be two-dimensional information.

The HMI 26 is an interface for inputting and outputting information between the autonomous driving system 3 and the occupant. The HMI 26 includes a display, a speaker, and the like as an example. The HMI 26 outputs an image on the display and outputs a voice from the speaker according to a control signal from the ECU 25. The display may be a head-up display. As an example, the HMI 26 includes input devices (buttons, a touch panel, a voice input device, and the like) for receiving the inputs from the occupant.

The actuator 27 is a device used for controlling the vehicle 2. The actuator 27 includes at least a throttle actuator, a brake actuator and a steering actuator.

The throttle actuator controls a driving force of the vehicle 2 by controlling an amount of air (throttle opening degree) supplied to the engine according to a control signal from the ECU 25. If the vehicle 2 is a hybrid vehicle, in addition to the amount of air supplied to the engine, the control signal from the ECU 25 is input to a motor as a power source, and then, the driving force of the vehicle 2 is controlled. If the vehicle 2 is an electric vehicle, the control signal from the ECU 25 is input to a motor as a power source, and then, the driving force of the vehicle 2 is controlled. The motor as the power source in these cases configures the actuator 27.

The brake actuator controls the brake system according to the control signal from the ECU 25 and controls a braking force applied to the wheels of the vehicle 2. For example, a hydraulic brake system can be used as the brake system.

The steering actuator controls the driving of an assist motor controlling a steering torque of an electric power steering system according to the control signal from the ECU 25. In this way, the steering actuator controls the steering torque of the vehicle 2.

The ECU 25 is hardware that performs overall management of the autonomous driving system 3 and is an arithmetic calculation device. The ECU 25 is connected to a network that communicates using, for example, the CAN communication circuit, and is connected to the above-described configuration elements of the vehicle 2 so as to be able to communicate with each other. That is, the ECU 25 can refer to the result of measurement from the GPS receiver 20, the result of detection performed by the external sensor 21, the internal sensor 22, and the biosensor 23, and the map information in the map database 24. The ECU 25 can refer to the information input to the HMI 26. The ECU 25 can output the signals to the HMI 26 and the actuator 27.

For example, the ECU 25 realizes each function of the autonomous driving to be described later by loading a program stored in the ROM into the RAM, and executes the program loaded in the RAM using the CPU. The ECU 25 may be configured with a plurality of ECUs.

Functionally, the ECU 25 includes a trajectory determination unit 1 and a travel control unit 250. The trajectory determination unit 1 determines a trajectory of the vehicle 2 that travels with an autonomous driving. The travel control unit 250 causes the vehicle 2 to travel with autonomous driving based on the trajectory determined by the trajectory determination unit 1.

Details of Trajectory Determination Unit

Figure 2:
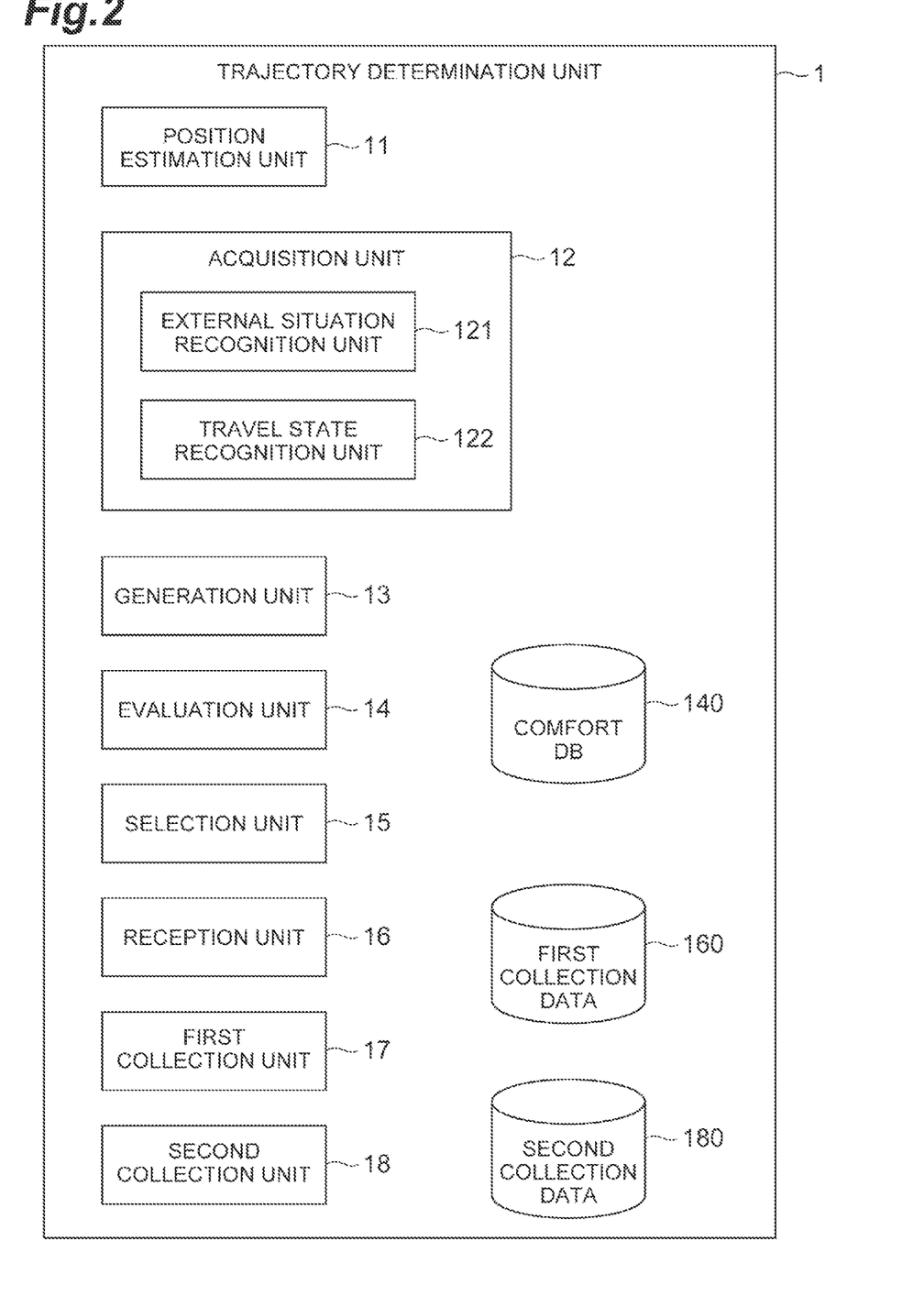
FIG. 2 is a block diagram illustrating an example of the trajectory determination unit.

FIG. 2 is a block diagram illustrating an example of the trajectory determination unit. As illustrated in FIG. 2, the trajectory determination unit 1 functionally includes a position estimation unit 11, an acquisition unit 12, a generation unit 13, an evaluation unit 14, a selection unit 15, a reception unit 16, a first collection unit 17, and a second collection unit 18. The trajectory determination unit 1 includes, as information, a comfort database 140, first collection data 160, and second collection data 180. The comfort database 140, the first collection data 160, and the second collection data 180 may exist outside the trajectory determination unit 1, for example, in the hard disk drive (HDD) mounted on the vehicle 2.

The position estimation unit 11 estimates a position of the vehicle 2. As an example, the position estimation unit 11 recognizes the position of the vehicle 2 on the map based on the information on the position of the vehicle 2 received by the GPS receiver 20 and the map information in the map database 24. The position estimation unit 11 may recognize the position of the vehicle 2 on the map using a method other than the method described above. For example, the position estimation unit 11 may recognize the position of the vehicle 2 using the SLAM technology using the position confirmation information in the map database 24 and the result of detection performed by the external sensor 21. If the position of the vehicle 2 can be measured and obtained using a sensor installed outside such as on the road, the position estimation unit 11 may recognize the position of the vehicle 2 by communicating with this sensor.

The acquisition unit 12 acquires driving environment information relating to the driving environment of the vehicle 2. The driving environment information includes information relating to the external situations and information relating to the travel state. The acquisition unit 12 includes an external situation recognition unit 121 that recognizes the external situations of the vehicle 2 and a travel state recognition unit 122 that recognizes the travel state of the vehicle 2.

As an example, the external situation recognition unit 121 recognizes an object around the vehicle 2 based on the result of detection performed by the external sensor 21 and the map information in the map database 24. If the earth surface information is included in the map information, the external situation recognition unit 121 detects an object from the deviation of the object from the ground. The external situation recognition unit 121 may apply a ground estimation model to the result of detection performed by the external sensor 21 and may detect the object from the deviation of the object from the ground. The external situation recognition unit 121 may recognize the object based on the result of communication.

The object includes moving objects such as pedestrians, bicycles, and other vehicles in addition to the stationary objects that do not move, such as utility poles, guardrails, trees, buildings. The external situation recognition unit 121 recognizes the object each time the result of detection is acquired from the external sensor 21, for example.

As an example, the external situation recognition unit 121 detects a moving object from the recognized objects using the background information. The external situation recognition unit 121 may detect the moving object using other methods. The external situation recognition unit 121 detects the amount of movement of the moving object at that time point by applying a Kalman filter, a particle filter, or the like to the detected moving object. The amount of movement includes a movement direction and a movement speed of the moving object. The amount of movement may include a rotational speed of the moving object. In addition, the external situation recognition unit 121 may perform an error estimation of amount of movement.

The external situation recognition unit 121 may specify the type of the moving object by image recognition processing by the camera (comparison processing between the object and the image model) or the like. If the type of the moving object can be specified, the external situation recognition unit 121 corrects the amount of movement of the moving object and the error of movement based on the type of the moving object.

The moving object may or may not include other vehicles parked, stopped pedestrians, and the like. The movement direction of another vehicle whose speed is zero can be estimated, for example, by detecting the front of the vehicle by the image processing in the camera. Similarly, the movement direction of the pedestrian who is not moving can also be estimated by detecting the direction of the face.

The external situation recognition unit 121 recognizes the traveling boundary lines of lane in which the vehicle 2 travels based on the result of detection performed by the external sensor 21.

The external situation recognition unit 121 may calculate a time to collision with the surrounding vehicles. The time to collision is a time obtained by dividing the relative distance between the vehicle 2 and the surrounding vehicle in the traveling direction of the vehicle 2 by the relative speed between the vehicle 2 and the surrounding vehicle in the traveling direction. The external situation recognition unit 121 calculates the time to collision for each surrounding vehicle.

The external situation recognition unit 121 may calculate an existence density of the surrounding vehicles. The existence density of the surrounding vehicles is a value obtained by dividing the number of surrounding vehicles within a predetermined area including the position of the vehicle 2 by the area of the predetermined area.

The travel state recognition unit 122 recognizes the travel state of the vehicle 2 based on the result of detection performed by the internal sensor 22 (for example, the vehicle speed information by vehicle speed sensor, the acceleration information by the accelerator sensor, the yaw rate information by the yaw rate sensor, and the like). The travel state of vehicle 2 includes, for example, the vehicle speed, the acceleration, and the yaw rate.

The acquisition unit 12 acquires information in which the external situation of the vehicle 2 recognized by the external situation recognition unit 121 and the travel state of the vehicle 2 recognized by the travel state recognition unit 122 are associated with each other, as the driving environment information. As an example, the driving environment information includes at least one of the number of surrounding vehicles around the vehicle 2, the time to collision with the surrounding vehicles described above, and the existence density of the above surrounding vehicles. That is, the driving environment information may include all of the number, the time to collision and the existence density, or may include any one of the number of surrounding vehicles, the time to collision, and the existence density. The driving environment information may include a behavior of the surrounding vehicle around the vehicle 2 (for example, change in amount of movement per unit time).

Figure 3A:
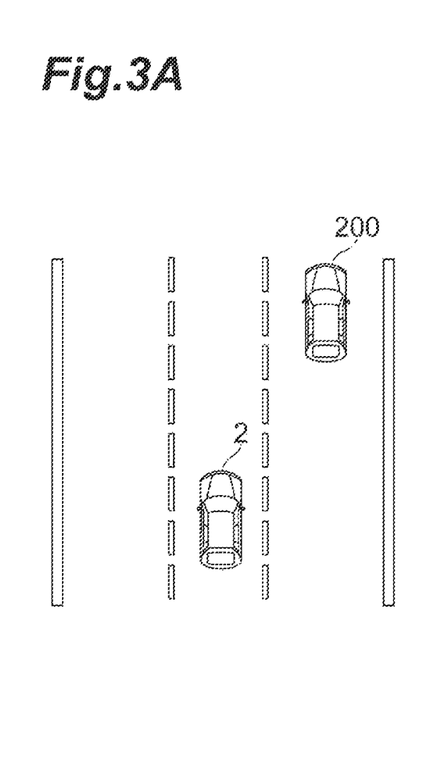
FIG. 3A, FIG. 3B, and FIG. 3C are diagrams illustrating examples of driving scenes.

FIG. 3A, FIG. 3B, and FIG. 3C are diagrams illustrating examples of driving scenes. FIG. 3A illustrates a driving scene in which one surrounding vehicle 200 travels in the right front of the vehicle 2. As illustrated in FIG. 3A, the surrounding vehicle 200 stably travels in a state in which the vehicle-to-vehicle distance to the vehicle 2 is sufficient. It is assumed that the time to collision with the surrounding vehicle is X1 second and the existence density is Y1. In this case, the acquisition unit 12 causes the combination of the number, the time to collision and the existence density (1, X1, Y1) to be included in the driving environment information.

Figure 3B:
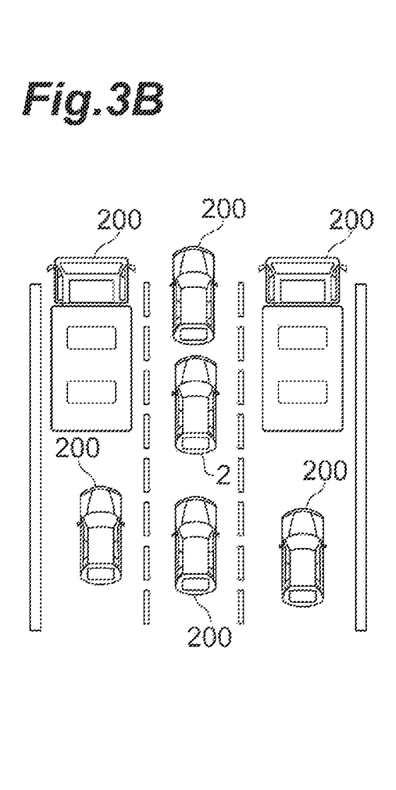

FIG. 3B illustrates a driving scene in which six surrounding vehicles 200 are traveling around the vehicle 2. As illustrated in FIG. 3B, the six surrounding vehicles 200 are stably traveling in a state where the vehicle-to-vehicle distance to the vehicle 2 is not sufficient. It is assumed that the existence density is Y2, and the time to collision with each surrounding vehicle 200 is X2 to X7 seconds. In this case, the acquisition unit 12 causes the combination of the number, the time to collision and the existence density (6, X2 to X7, Y2) to be included in the driving environment information.

Figure 3C:
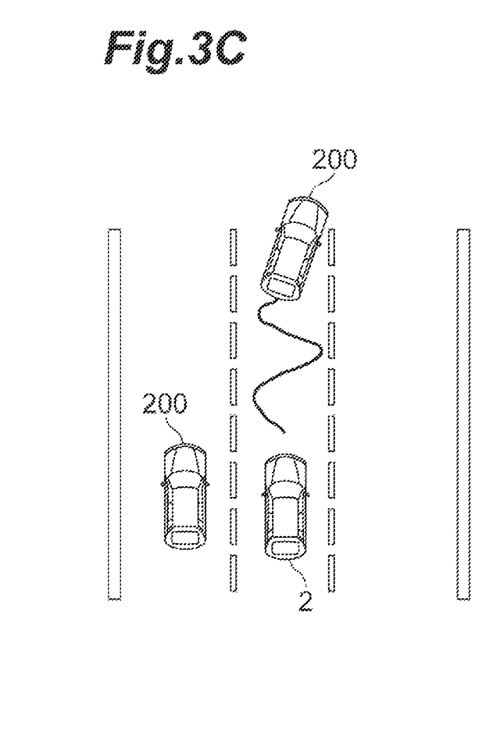

FIG. 3C illustrates a driving scene in which two surrounding vehicles 200 are traveling around the vehicle 2. As illustrated in FIG. 3C, the two surrounding vehicles 200 are a vehicle traveling side by side next to the vehicle 2 and a vehicle traveling while wandering in front of the vehicle 2. It is assumed that the existence density is Y3 and the time to collision with each surrounding vehicle 200 is X8 and X9 seconds. In this case, the acquisition unit 12 causes the combination of the number, the time to collision and the existence density (2, X8 and X9, Y3) to be included in the driving environment information. If the change in amount of movement per unit time of the vehicle traveling wandering in front of the vehicle 2 is M, the acquisition unit 12 causes a combination (2, X8 and X9, Y3, M) of the number, the time to collision, the existence density and the amount of movement change to be included in the driving environment information.

The generation unit 13 generates a plurality of trajectory candidates for the vehicle 2 based on the position of the vehicle 2 and the map information. The generation unit 13 may generate a plurality of trajectory candidates for the vehicle 2 based on the position of the vehicle 2, the map information, and the driving environment information. As a specific example, the generation unit 13 generates a plurality of trajectory candidates for the vehicle 2 based on the result of detection performed by the external sensor 21, the map information in the map database 24, the position of the vehicle 2 on the map estimated by the position estimation unit 11, the information on the object (including the boundary lines) recognized by the external situation recognition unit 121, and the travel state of the vehicle 2 recognized by the travel state recognition unit 122, and the like.

As an example, the generation unit 13 generates a plurality of trajectory candidates for the vehicle 2 assuming the behavior of the object around the vehicle 2. Examples of the assumption of the behavior of the object include an assumption that all the objects around the vehicle 2 are stationary objects, an assumption that the moving object moves independently, an assumption that the moving object moves while interacting with at least one of another object and the vehicle 2, and the like. The trajectory candidate may include at least one trajectory in which vehicle 2 travels while avoiding the object.

The evaluation unit 14 evaluates driving comfort for each trajectory candidate based on the driving environment information acquired by the acquisition unit 12 and the plurality of trajectory candidates generated by the generation unit 13. The driving comfort is an indicator of occupant's satisfaction with driving. The excellence of driving comfort can be expressed by the magnitude of the evaluation value. In other words, the evaluation value is a value indicating a degree of driving comfort. As an example, the evaluation value indicates that the driving comfort is excellent as the value increases. The evaluation unit 14 evaluates the driving comfort for each trajectory candidate by outputting the evaluation value for each trajectory candidate.

The evaluation unit 14 outputs the evaluation value for each trajectory candidate based on the comfort database 140, the driving environment information acquired by the acquisition unit 12, and the plurality of trajectory candidates generated by the generation unit 13. The comfort database 140 is a storage device that stores the driving environment information, the trajectory, and the evaluation value in association with each other.

The evaluation unit 14 refers to the comfort database 140. The evaluation unit 14 refers to the comfort database 140 using the combination of the driving environment information acquired by the acquisition unit 12 and the trajectory candidate generated by the generation unit 13 as a search key. Thus, the evaluation unit 14 can determine the evaluation value corresponding to the combination of the driving environment information and the trajectory candidate.

Figure 4A:
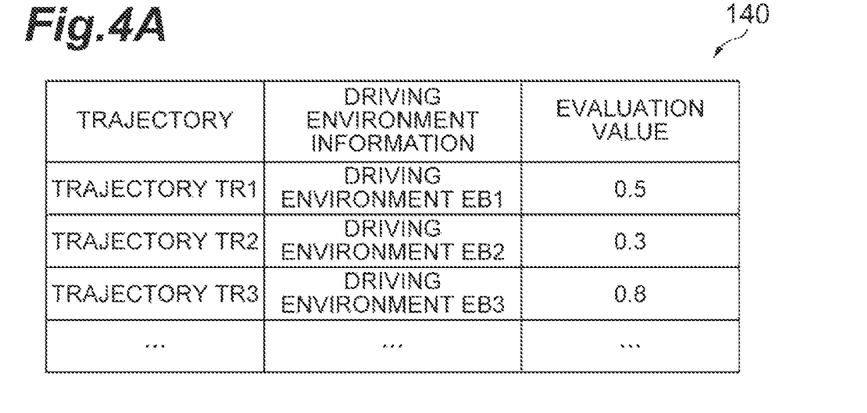
FIG. 4A, FIG. 4B, and FIG. 4C are diagrams illustrating examples of pieces of information to be processed.

FIG. 4A, FIG. 4B, and FIG. 4C are diagrams illustrating examples of information to be processed. FIG. 4A is an example of information stored in the comfort database 140. As illustrated in FIG. 4A, in the comfort database 140, the trajectory, the driving environment information, and the evaluation value are associated with each other. For example, a "trajectory TR1", a "driving environment EB1" and an evaluation value "0.5" are associated with each other. As an example, the evaluation values are values from 0 to 1, and indicate that 1 means most comfortable. The evaluation value is not limited to the above-described format and any format can be used as long as the size can be expressed by numerical values. Similarly, a "trajectory TR2", a "driving environment EB2" and an evaluation value "0.3" are associated with each other. Similarly, a "trajectory TR3", a "driving environment EB3" and an evaluation value "0.8" are associated with each other. As an example, if the trajectory generated by the generation unit 13 is the "trajectory TR2" and the driving environment information acquired by the acquisition unit 12 is the "driving environment EB2", the evaluation unit 14 outputs the evaluation value as "0.3" referring to the comfort database 140 using the combination of the "trajectory TR2" and the "driving environment EB2" as a search key.

If the driving environment information as the search key is not stored in the comfort database 140, the evaluation unit 14 may determine the evaluation value referring to similar driving environment information included in the comfort database 140. If the trajectory candidate as the search key is not stored in the comfort database 140, the evaluation unit 14 may determine the evaluation value referring to similar driving environment information included in the comfort database 140.

The evaluation unit 14 may determine a similarity degree of the driving environment information items based on the difference between the driving environment information as the search key and the driving environment information included in the comfort database 140. For example, the evaluation unit 14 determines that the similarity degree is larger as the difference decreases. The evaluation unit 14 may determine the similarity degree of the trajectory candidates based on the difference between the trajectory candidate as the search key and the driving environment information included in the comfort database 140. For example, the evaluation unit 14 determines that the similarity degree is larger as the difference decreases. The evaluation unit 14 may set an average value of the similarity degree of the driving environment information and the similarity degree of the trajectory candidate as the final similarity degree, and then, may acquire the evaluation value associated with the combination having the highest final similarity degree. The evaluation unit 14 may output the acquired evaluation value as it is as an evaluation value or may output a value obtained by multiplying the obtained evaluation value by a coefficient corresponding to the final similarity degree as an evaluation value.

The selection unit 15 selects one trajectory for traveling with the autonomous driving from the plurality of trajectory candidates based on the driving comfort for each trajectory candidate evaluated by the evaluation unit 14. As an example, the selection unit 15 selects a trajectory candidate having the highest evaluation value as a trajectory for traveling with the autonomous driving from the plurality of trajectory candidates. In this way, a trajectory is determined while taking the driving comfort into consideration.

An Example of Enhancement of Comfort Database

As the number of data items stored in the comfort database 140 increases, the evaluation unit 14 may be able to output the evaluation value more accurately. For this purpose, the trajectory determination unit 1 includes a reception unit 16, a first collection unit 17 and a second collection unit 18 for constructing the comfort database 140.

The reception unit 16 receives an input operation relating to the driving comfort of the occupant of the vehicle 2. The input operation relating to the driving comfort is an evaluation action of the driving comfort performed by the occupant. The input operation is an action performed on the input interface by the occupant according to the psychological burden felt by the occupant of the vehicle 2 during the autonomous driving or the manual driving. As an example, the input operation is the operation of the HMI 26 by the occupant of vehicle 2. For example, the HMI 26 includes a comfort button that is operated by the occupant in a driving scene in which the occupant feels that the driving comfort is excellent (the psychological burden is low), a discomfort button that is operated by the occupant in a driving scene in which the occupant feels that the driving comfort is not excellent (the psychological burden is high). The reception unit 16 receives the input operation of the comfort button and the discomfort button by the occupant via the HMI 26. The HMI 26 may include a stepwise input button that allows for inputting stepwise evaluation of the driving comfort. The HMI 26 may include an interface for obtaining an input operation by occupant's voice.

For example, in the driving scene illustrated in FIG. 3A, the number of surrounding vehicles 200 is small, and the vehicle-to-vehicle distance between the vehicle 2 and the surrounding vehicle 200 is also sufficient. In such a driving scene, the occupant's psychological burden on driving is low, and thus, the occupant presses the comfort button. For example, in the driving scene illustrated in FIG. 3B, the number of surrounding vehicles 200 is large, and the vehicle-to-vehicle distance between the vehicle 2 and surrounding vehicle 200 is also short. In such a driving scene, the occupant's psychological burden on driving is high, and thus, the occupant presses the discomfort button. For example, in the driving scene illustrated in FIG. 3C, the behavior of the preceding surrounding vehicle 200 is unstable. In such a driving scene, the occupant's psychological burden on driving is high, and thus, the occupant presses the discomfort button.

The timing of pressing the discomfort button is easily understood by the driver because it is a driving scene with a high psychological burden. On the other hand, the comfort button may not be positively pressed at a right timing because it is a driving scene with a low psychological burden. Therefore, the reception unit 16 may notify the occupant of a message prompting the input operation at a predetermined cycle or a predetermined driving scene.

The first collection unit 17 generates a first collection data 160 in which the information relating to the occupant's input operation received by the reception unit 16, the trajectory of the vehicle 2 when the input operation is received, and the driving environment information when the input operation is received are associated with each other. The first collection unit 17 generates the information relating to the input operation based on the occupant's input operation received by the reception unit 16. For example, the first collection unit 17 generates a score (an example of information on the input operation) that is counted up when the comfort button is pressed and counted down when the discomfort button is pressed according to the input operation. The first collection unit 17 may generate the score based on the input operation of the stepwise input button.

If the discomfort button is not pressed for a predetermined period, the first collection unit 17 may regard that the comfort button is pressed during that period. In addition, the first collection unit 17 may include the evaluation value determined based on the score in the first collection data 160 as the information on occupant's input operation. For example, the first collection unit 17 may standardize the score as the evaluation value. The first collection unit 17 may derive the evaluation value from the score based on a correspondence table between the score and the evaluation value. The first collection unit 17 may calculate the evaluation value based on formula with the score as a variable.

If the input operation form the occupant is accepted by the reception unit 16, the first collection unit 17 generates the first collection data 160 in which the information relating to the input operation, the driving environment information acquired by the acquisition unit 12, and trajectory of the vehicle 2 selected by the selection unit 15 are associated with each other.

Figure 4B:
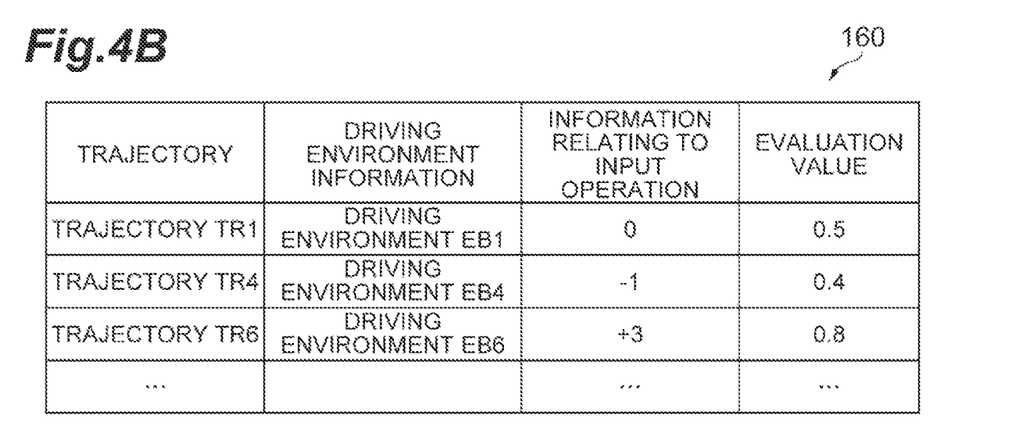

FIG. 4B is an example of the first collection data 160. As illustrated in FIG. 4B, in the first collection data 160, the trajectory, the driving environment information, and the score (an example of information relating to input operation) are associated with each other. In the first collection data 160, the evaluation value (an example of the information relating to the input operation) may further be associated. For example, the "trajectory TR1", the "driving environment EB1", the score "0", and the evaluation value "0.5" are associated with each other. An example of evaluation value is a value from 0 to 1, which indicates that 1 means most comfortable. The evaluation value is not limited to be expressed in the format described above, and any format can be used as long as the size is expressed using numerical values. Similarly, the "trajectory TR4", the "driving environment EB4", the score "A", and the evaluation value "0.4" are associated with each other. Similarly, the "trajectory TR3", the "driving environment EB6", the score "+3", and the evaluation value "0.8" are associated with each other.

The first collection data 160 may be stored in the comfort database 140. For example, the trajectory determination unit 1 stores the first collection data 160 in the comfort database 140 each time the first collection data 160 is generated. The first collection unit 17 may store the first collection data 160 in the comfort database 140 when the predetermined condition is satisfied. For example, if the similarity degree between the data stored in the comfort database 140 and the first collection data 160 is smaller than a threshold value, the trajectory determination unit 1 determines that the predetermined condition is satisfied. The similarity degree can be calculated by the same method as the similarity degree calculated in the evaluation unit 14.

The second collection unit 18 generates the second collection data 180 in which the information relating to the biometric information on the driver (an example of the occupant) acquired by the biosensor 23, the trajectory of the vehicle 2 when the biometric information is acquired, and the driving environment information when the biometric information is acquired are associated with each other.

The result of detection performed by the biosensor 23 reflects the psychological burden of the occupant. For example, in the driving scene illustrated in FIG. 3A, the number of surrounding vehicles 200 is small, and the vehicle-to-vehicle distance between the vehicle 2 and the surrounding vehicle 200 is also sufficient. In such a driving scene, since the occupant's psychological burden on driving is small, the biometric information detected by the biosensor 23 is stable. For example, the heart rate, the blood pressure, the body temperature, the handle gripping pressure, and the perspiration amount per unit time do not greatly change. For example, in the driving scene illustrated in FIG. 3B, the number of surrounding vehicles 200 is large, and the vehicle-to-vehicle distance between the vehicle 2 and the surrounding vehicle 200 is also short. In such a driving scene, since the psychological burden of the occupant on driving is large, the biometric information detected by the biosensor 23 is unstable. For example, the amount of change of the heart rate, the blood pressure, the fluctuation amount of the body temperature, the handle gripping pressure, and the perspiration amount per unit time increase, or the number of changes per unit time increases. For example, in the driving scene shown in FIG. 3C, the behavior of the preceding surrounding vehicle 200 is unstable. In such a driving scene, since the occupant's psychological burden on driving is large, similarly to the driving scene illustrated in FIG. 3B, the biometric information detected by the biosensor 23 is unstable.

The second collection unit 18 generates the information relating to the biometric information based on the biometric information on the occupant obtained by the biosensor 23. For example, the second collection unit 18 generates information relating to the biometric information when the predetermined condition is satisfied. The predetermined condition may be a temporal condition. For example, the second collection unit 18 may generate the information relating to the biometric information when a time set in advance has elapsed. The predetermined condition may be a condition relating to the changes of the biometric information. For example, the second collection unit 18 may generate the information relating to the biometric information when the amount of changes per unit time exceeds a threshold value or when the number of changes per unit time exceeds a threshold value.

For example, the second collection unit 18 generates a score (an example of information relating to the input operation) that decreases as the amount of changes per unit time in a predetermined period increases, according to the biometric information on the occupant. For example, the second collection unit 18 generates a score that decreases as the amount of changes per unit time regarding handle grasping pressure increases. The second collection unit 18 may generate a score that decreases as the number of changes per unit time in a predetermined period increases, according to the biometric information on the occupant. For example, the second collection unit 18 generates a score that decreases as the heart rate increases.

The second collection unit 18 may include the evaluation value determined based on the score in the second collection data 180 as the information relating to the biometric information on the occupant. For example, the second collection unit 18 may standardize the score as the evaluation value. The second collection unit 18 may derive the evaluation value from the score based on the correspondence table between the score and the evaluation value. The second collection unit 18 may calculate the evaluation value based on a formula with the score as a variable.

The second collection unit 18 generates the second collection data 180 in which the information relating to the generated biometric information, the driving environment information acquired by the acquisition unit 12, and the trajectory of the vehicle 2 selected by the selection unit 15 are associated with each other.

Figure 4C:
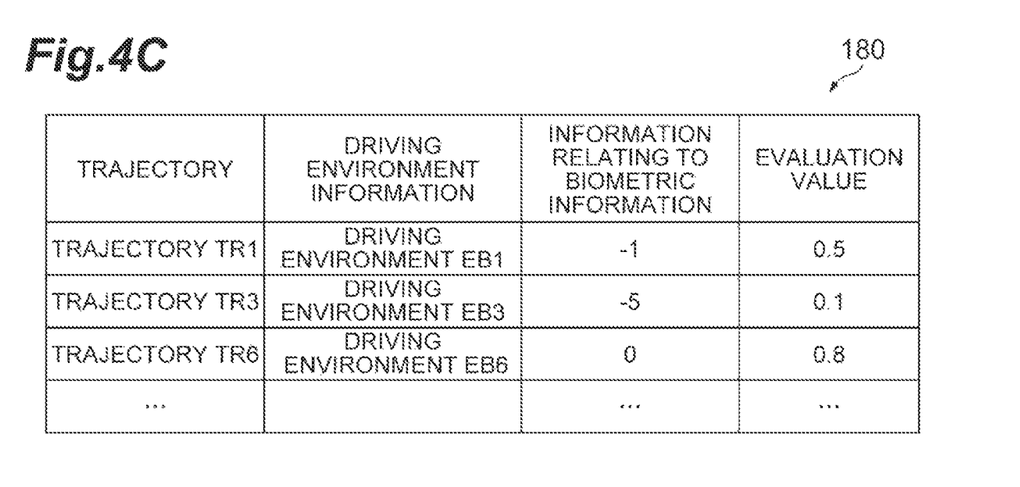

FIG. 4C is an example of the second collection data 180. As illustrated in FIG. 4C, in the second collection data 180, the trajectory, the driving environment information, and the score (an example of information relating to the biometric information) are associated with each other. In the second collection data 180, the evaluation value (an example of the information relating to the biometric information) may further be associated. For example, the "trajectory TR1", the "driving environment EB1", the score "A", and the evaluation value "0.5" are associated with each other. An example of evaluation value is a value from 0 to 1, which indicates that 1 means most comfortable. The evaluation value is not limited to be expressed in the format described above, and any format can be used as long as the size is expressed using numerical values. Similarly, the "trajectory TR3", the "driving environment EB3", the score "−5", and the evaluation value "0.1" are associated with each other. Similarly, the "trajectory TR6", the "driving environment EB6", the score "0", and the evaluation value "0.8" are associated with each other.

The second collection data 180 may be stored in the comfort database 140. For example, the second collection unit 18 stores the second collection data 180 in the comfort database 140 each time the second collection data 180 is generated. The second collection unit 18 may store the second collection data 180 in the comfort database 140 when the predetermined condition is satisfied. For example, if the similarity degree between the data stored in the comfort database 140 and the second collection data 180 is smaller than the threshold value, the second collection unit 18 determines that the predetermined condition is satisfied. The similarity degree can be calculated by the same method as the similarity degree calculated in the evaluation unit 14.

Subsequently, details of the processing performed by the trajectory determination unit 1 will be described.

Processing for Generating First Collection Data

Figure 5:
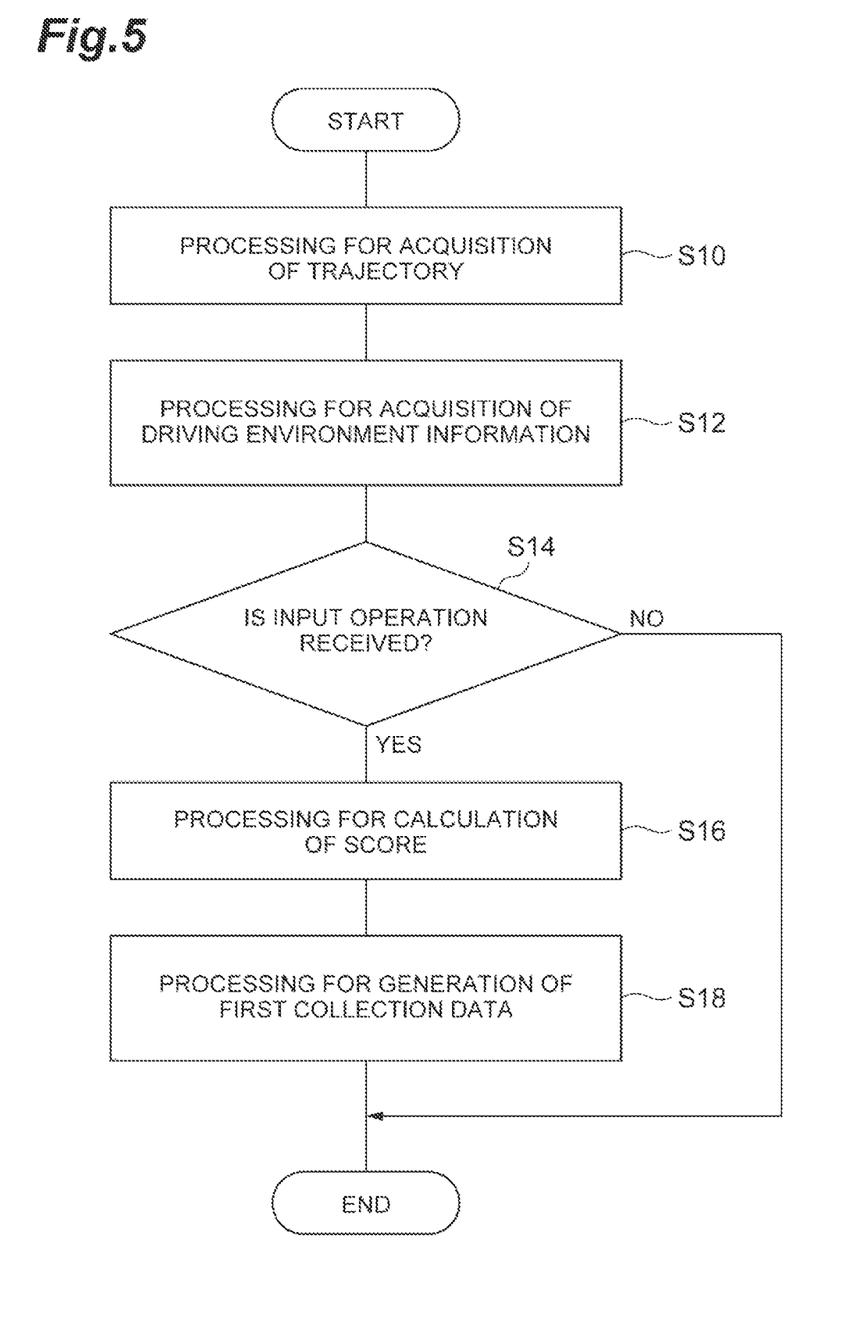
FIG. 5 is a flowchart illustrating an example of processing for generating first collection data.

FIG. 5 is a flowchart illustrating an example of the processing for generating the first collection data. The flowchart illustrated in FIG. 5 is executed by the first collection unit 17 of the trajectory determination unit 1.

As processing for acquisition (S10), the first collection unit 17 acquires the trajectory selected by the selection unit 15. Subsequently, as processing for acquisition (S12), the first collection unit 17 acquires the driving environment information acquired by the acquisition unit 12.

As processing for determination (S14), the first collection unit 17 determines whether or not the input operation is received by the reception unit 16. If it is determined that the input operation is received (YES in S14), as processing for calculation (S16), the first collection unit 17 calculates the score based on the input operation by the occupant. Subsequently, as processing for generation (S18), the first collection unit 17 generates the first collection data 160 by associating the trajectory acquired in the processing for acquisition (S10), the driving environment information acquired in the processing for acquisition (S12), and the score calculated in the processing for calculation (S16) with each other.

If it is determined that the input operation is not received (NO in S14), or if the processing for generation (S18) ends, the first collection unit 17 ends the processing in the flowchart illustrated in FIG. 5. The first collection unit 17 executes the flowchart illustrated in FIG. 5 from the beginning until the ending condition is satisfied. The ending condition is satisfied, for example, when an ending instruction is received from the occupant.

Processing for Generating Second Collection Data

Figure 6:
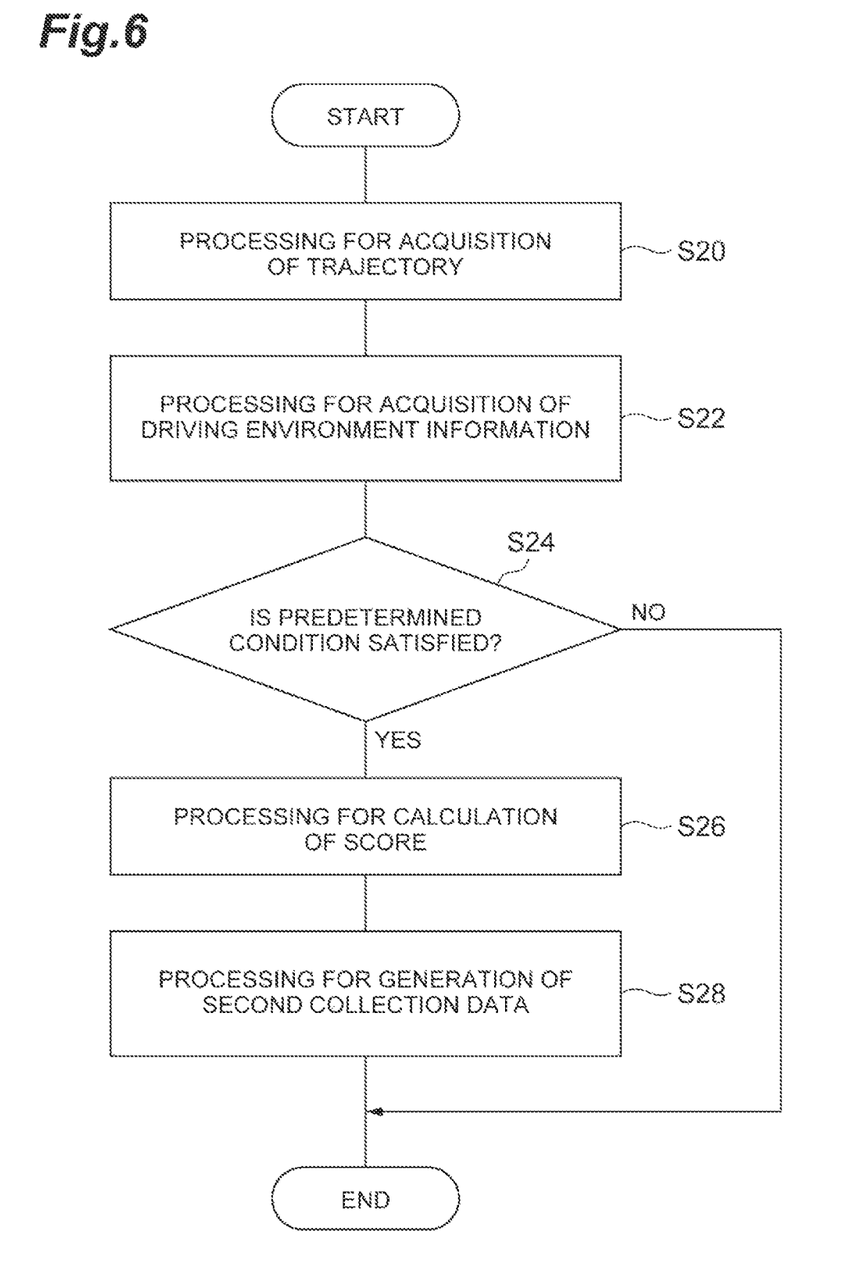
FIG. 6 is a flowchart illustrating an example of processing for generating second collection data.

FIG. 6 is a flowchart illustrating an example of processing for generating the second collection data. The flowchart illustrated in FIG. 6 is executed by the second collection unit 18 of the trajectory determination unit 1.

As processing for acquisition (S20), the second collection unit 18 acquires the trajectory selected by the selection unit 15. Subsequently, as processing for acquisition (S22), the second collection unit 18 acquires the driving environment information acquired by the acquisition unit 12.

As processing for determination (S24), the second collection unit 18 determines whether or not a predetermined condition is satisfied. The predetermined condition is satisfied, for example, when a time set in advance has elapsed. If it is determined that the predetermined condition is satisfied (YES in S24), as the processing for calculation (S26), the second collection unit 18 calculates the score based on the biometric information. Subsequently, as processing for generation (S28), the second collection unit 18 generates the second collection data 180 by associating the trajectory acquired in the processing for acquisition (S20), the driving environment information acquired in the processing for acquisition (S22), and the score calculated in the processing for calculation (S26) with each other.

If it is determined that the predetermined condition is not satisfied (NO in S44), or if the processing for generation (S28) ends, the second collection unit 18 ends the processing in the flowchart illustrated in FIG. 6. The second collection unit 18 executes the flowchart illustrated in FIG. 6 from the beginning until the ending condition is satisfied. The ending condition is satisfied, for example, when an ending instruction is received from the occupant.

Processing for Determination of Trajectory

Figure 7:
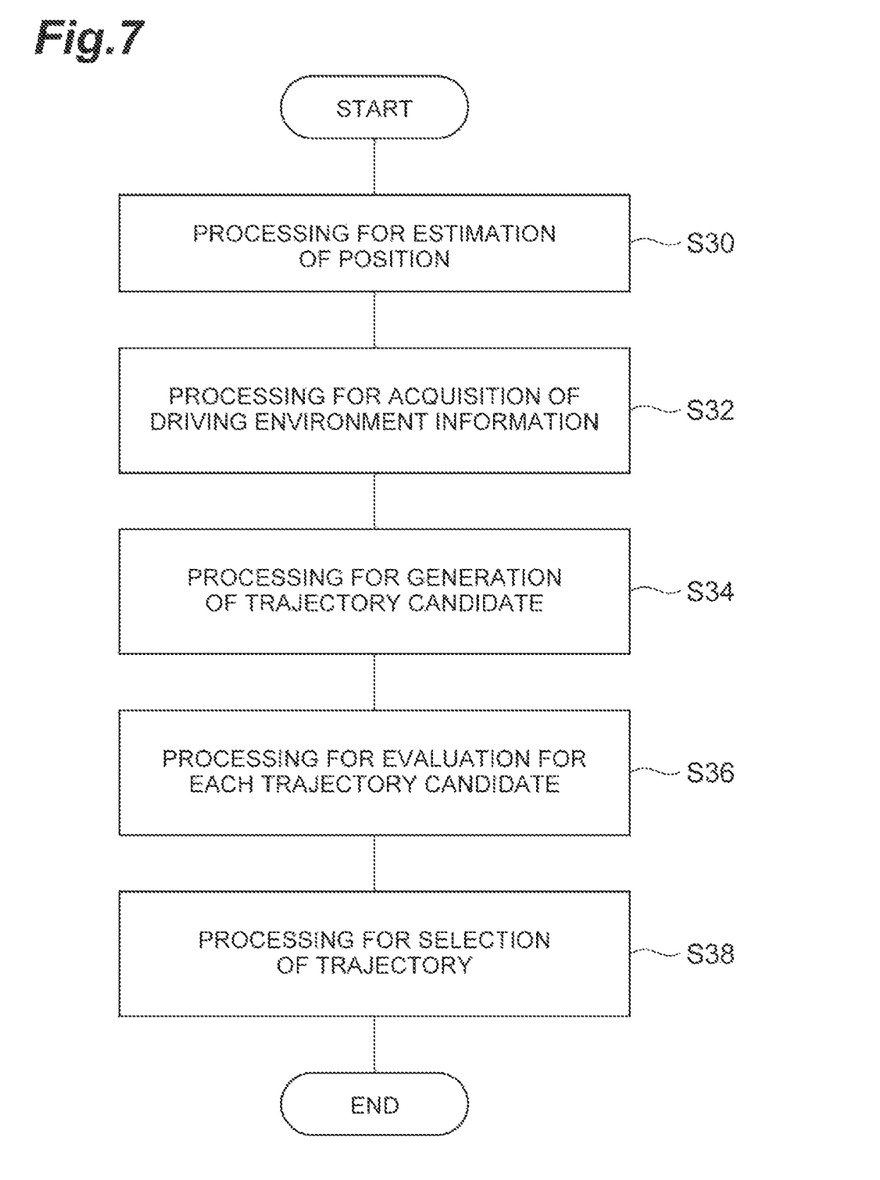
FIG. 7 is a flowchart illustrating an example of processing for determining the trajectory.

FIG. 7 is a flowchart illustrating an example of processing for determining the trajectory. The flowchart illustrated in FIG. 7 is executed by the trajectory determination unit 1.

As processing for determination of the position (S30), the position estimation unit 11 of the trajectory determination unit 1 estimates the position of the vehicle 2. As an example, the position estimation unit 11 estimates the position of the vehicle 2 on the map based on the information on the position of the vehicle 2 received by the GPS receiver 20 and the map information in the map database 24.

Subsequently, as processing for acquisition (S32), the acquisition unit 12 of the trajectory determination unit 1 acquires road environment information. The acquisition unit 12 acquires the road environment information based on the result of detection performed by the external sensor 21 and the internal sensor 22.

Subsequently, as processing for generation (S34), the generation unit 13 of the trajectory determination unit 1 generates the trajectory candidate. As an example, the generation unit 13 generates a plurality of trajectory candidates for the vehicle 2 assuming the behavior of the object around the vehicle 2.

Subsequently, as processing for evaluation (S36), the evaluation unit 14 of the trajectory determination unit 1 outputs the evaluation value for each trajectory candidate based on the driving environment information acquired in the processing for acquisition (S32) and the plurality of trajectory candidates generated in the processing for generation (S34). The evaluation unit 14 outputs the evaluation value for each trajectory candidate referring to the comfort database 140.

Subsequently, as processing for selection (S38), the selection unit 15 of the trajectory determination unit 1 selects one trajectory for traveling with the autonomous driving from the plurality of trajectory candidates based on the evaluation value for each trajectory candidate output in the processing for evaluation (36).

When the processing for selection (S38) ends, the trajectory determination unit 1 ends the processing in the flowchart illustrated in FIG. 7. The trajectory determination unit 1 executes the flowchart illustrated in FIG. 7 from the beginning until the ending condition is satisfied. The ending condition is satisfied, for example, when an ending instruction is received from the occupant.

Operational Effects of First Embodiment

In the trajectory determination unit 1 in the first embodiment, the driving comfort for each trajectory candidate is evaluated by the evaluation unit 14 based on the driving environment information and the trajectory candidates. Then, one trajectory for traveling with autonomous driving is selected from the plurality of trajectory candidates based on the driving comfort for each trajectory candidate. Therefore, the trajectory determination unit 1 can determine the trajectory for traveling with the autonomous driving from the plurality of trajectory candidates, while taking the driving comfort evaluated for each trajectory candidate into consideration.

The trajectory determination unit 1 in the first embodiment can evaluate the driving comfort of the trajectory candidate using the relationship between the driving environment information stored in the comfort database 140, the trajectory, and the evaluation value.

The trajectory determination unit 1 in the first embodiment can generate the first collection data 160 in which the information corresponding to the occupant's input operation is used as the evaluation value. The first collection data 160 can be stored in the comfort database 140. The trajectory determination unit 1 in the first embodiment can generate the second collection data 180 in which the information corresponding to the biometric information is used as the evaluation value. The second collection data 180 can be stored in the comfort database 140.

The trajectory determination unit 1 in the first embodiment selects the trajectory candidate having the highest evaluation value from the plurality of trajectory candidates as a trajectory for traveling with the autonomous driving. Therefore, it is possible to select a trajectory that gives a least discomfort to the occupant from the trajectory candidates.

The trajectory determination unit 1 in the first embodiment can clarify the relationship between the trajectory, the driving comfort, and the driving environment information by including at least one of the number of surrounding vehicles 200 around the vehicle 2, the time to collision with the surrounding vehicle 200, and the existence density of the surrounding vehicle 200 in the driving environment information.

Second Embodiment

Figure 8:
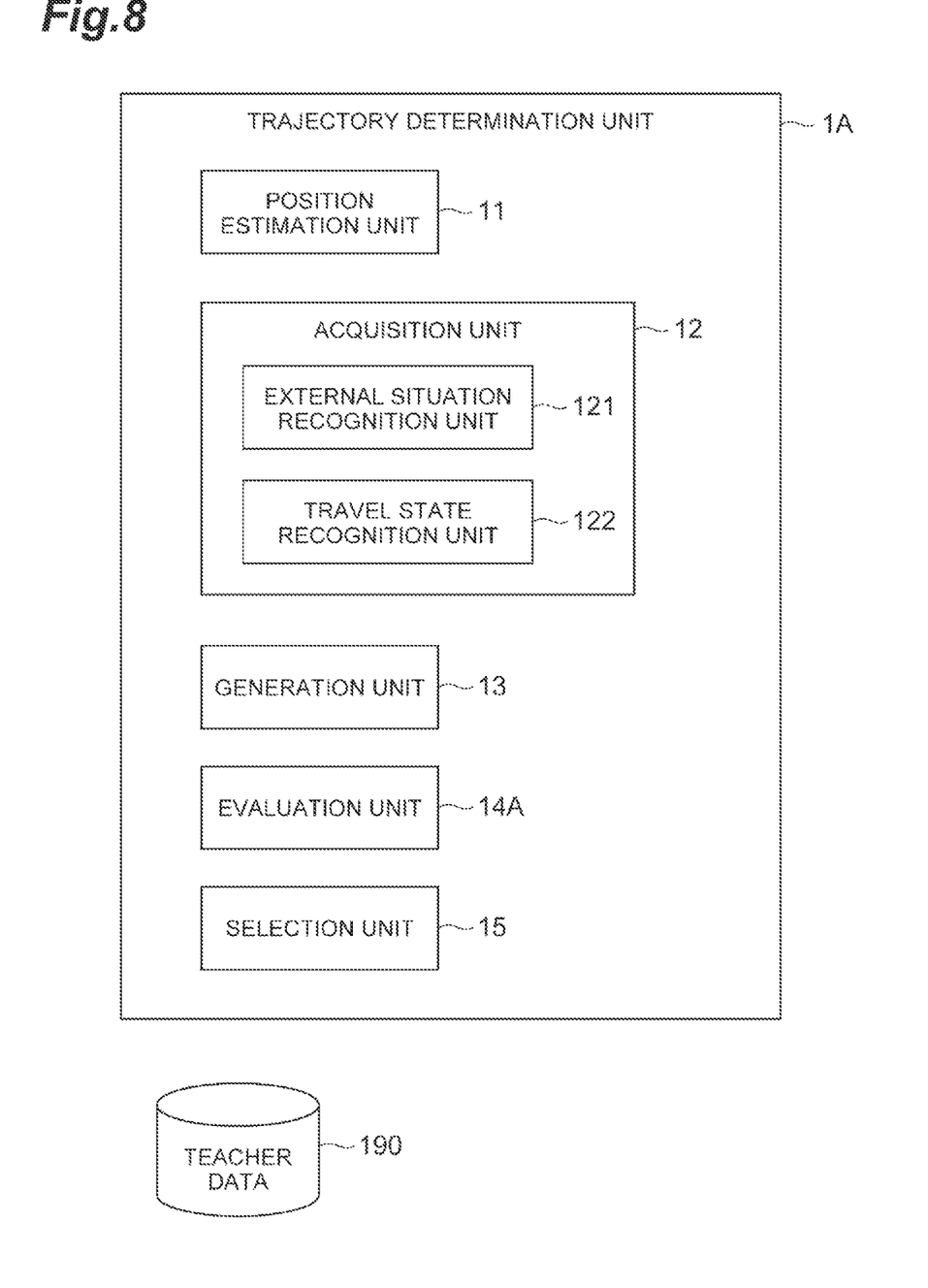
FIG. 8 is a block diagram illustrating another example of the trajectory determination unit.

A configuration of a trajectory determination unit 1A in a second embodiment is different from the configuration of the trajectory determination unit 1 in the first embodiment in a point that a function of an evaluation unit is different and the reception unit 16, the first collection unit 17, the second collection unit 18, the comfort database 140, the first collection data 160, and the second collection data 180 are not included. The overlapping description will not be repeated below.

FIG. 8 is a block diagram illustrating another example of the trajectory determination unit. As illustrated in FIG. 8, the trajectory determination unit 1A includes a position estimation unit 11, an acquisition unit 12, a generation unit 13, an evaluation unit 14A, and a selection unit 15.

In the evaluation unit 14A, a machine learning is performed such that the driving environment information and the trajectory are input and the evaluation value is output based on teacher data 190 in which driving environment information, an evaluation value indicating a degree of driving comfort are associated with other. The teacher data 190 is data to be used in supervised machine learning. The teacher data 190 is the data same as that stored in the comfort database 140, and is data in which the driving environment information, the trajectory, and the evaluation value are associated with each other. The teacher data 190 provides an evaluation value corresponding to a combination of the driving environment information and the trajectory to the evaluation unit 14A.

As an example, the evaluation unit 14A includes a neural network specified by nodes and parameters. The neural network is constructed by the machine learning based on the teacher data 190. For example, the combination of the driving environment information and the trajectory obtained by referring to the teacher data 190 is input to the neural network of the evaluation unit 14A. Then, the parameters of the neural network are adjusted such that the output of the neural network becomes the evaluation value obtained by referring to the teacher data 190. In this way, in the evaluation unit 14A, the machine learning is performed such that the driving environment information and the trajectory are input and the evaluation value is output. That is, the evaluation unit 14A is configured as a discriminator that outputs the evaluation value in response to the input.

The position estimation unit 11, the acquisition unit 12, the generation unit 13, and the selection unit 15 of the trajectory determination unit 1A are the same as the position estimation unit 11, the acquisition unit 12, the generation unit 13, and the selection unit 15 of the trajectory determination unit 1. In addition, the operation of the trajectory determination unit 1A is the same as that of the trajectory determination unit 1.

Operational Effects of Second Embodiment

According to the trajectory determination unit 1A in the second embodiment, the driving comfort of the trajectory candidates can be evaluated based on the result of learning the relationship between the driving environment information, the trajectory, and the evaluation value.

The embodiments described above can be implemented in various forms in which various changes and improvements are made based on knowledge of those skilled in the art.

For example, the trajectory determination unit 1 may not include the reception unit 16, the first collection unit 17, and the second collection unit 18. In addition, the vehicle 2 may not include the biosensor 23.

In FIG. 5, the processing for acquisition (S10) and the processing for acquisition (S12) may be performed in reverse order. In FIG. 5, the processing for acquisition (S10) and the processing for acquisition (S12) may be performed after the processing for determination (S14).

In FIG. 6, the processing for acquisition (S20) and the processing for acquisition (S22) may be performed in reverse order. In FIG. 6, the processing for acquisition (S20) and the processing for acquisition (S22) may be performed after the processing for determination (S24).

In FIG. 7, the processing for determination of the position (S30) and the processing for acquisition (S32) may be performed in reverse order.

What is claimed is:

1. A trajectory determination device that is configured to determine a trajectory of an autonomous vehicle, the trajectory determination device comprising:
   a database configured to associate driving environment information of the autonomous vehicle, the trajectory of the autonomous vehicle, and an evaluation value indicating a degree of driving comfort of an occupant of the autonomous vehicle;
   a human machine interface configured to receive an input operation relating to the driving comfort of the occupant of the vehicle; and
   a processor configured to:
   estimate a position of the autonomous vehicle;
   acquire the driving information relating to the driving environment of the autonomous vehicle;
   generate a plurality of trajectory candidates of the autonomous vehicle based on the position of the autonomous vehicle and map information;
   output an evaluation value for each trajectory candidate based on information stored in the database, the driving environment information, and the plurality of trajectory candidates;
   select one trajectory, for the autonomous vehicle to travel, from the plurality of trajectory candidates based on the driving comfort for each trajectory candidate; and
   generate first collection data in which information relating to the input operation by the occupant, received by the human machine interface, the trajectory of the autonomous vehicle when the input operation is received, and the driving environment information when the input operation is received are associated with each other.

2. The trajectory determination device according to claim 1, further comprising:
   a sensor configured to acquire biometric information on the occupant of the autonomous vehicle,
   wherein the processor is further configured to generate second collection data in which information relating to the biometric information on the occupant, acquired by the sensor, the trajectory of the autonomous vehicle when the biometric information is acquired, and the driving environment information when the biometric information is acquired are associated with each other.

3. The trajectory determination device according to claim 1,
   wherein the evaluation value indicates that the driving comfort increases as the evaluation value increases, and
   wherein the processor is further configured to select a trajectory candidate having a highest evaluation value from the plurality of trajectory candidates as the one trajectory for the autonomous vehicle to travel.

* * * * *